Patented Mar. 29, 1949

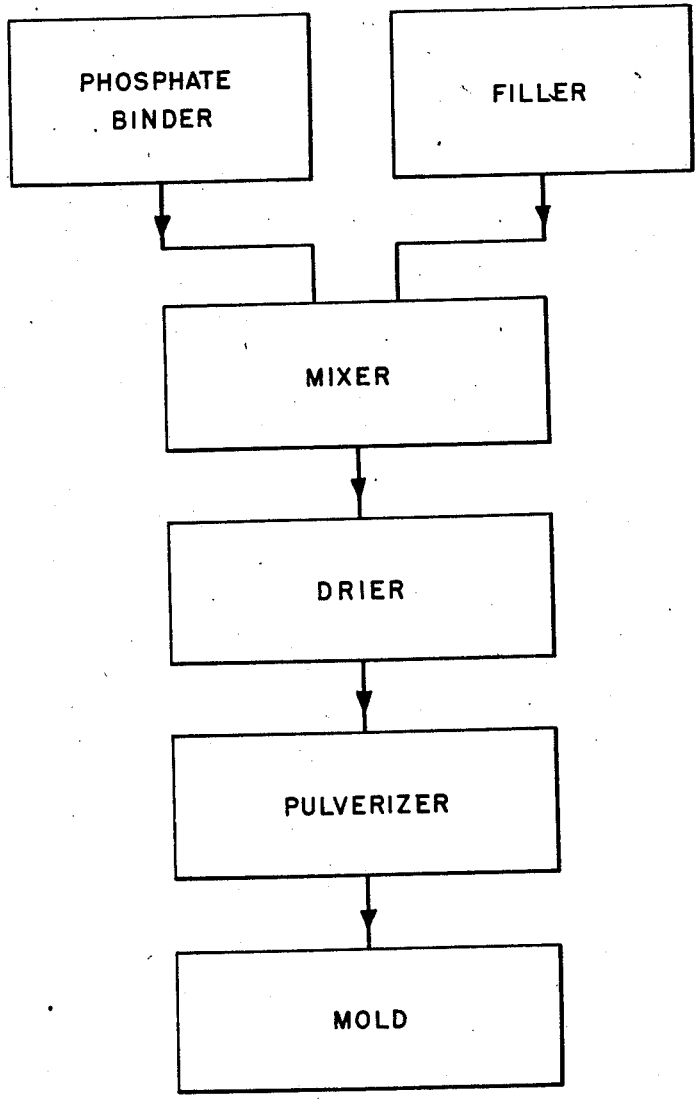

2,465,645

UNITED STATES PATENT OFFICE 2,465,645

BONDED COMPOSITION

Herbert H. Greger, Washington, D. C.

Application September 15, 1942, Serial No. 458,461

10 Claims. (Cl. 18—47.5)

This invention relates to compositions comprising wood particles such as sawdust, wood flour and fibrous pulp bonded together with phosphatic acid base binders, and to processes of making such compositions.

The principal object of the present invention is to provide a new composition formed of woody material bonded together with a suitable permanent binder and processes of making such compositions.

Another object of this invention is to provide a composition of matter formed of wood particles bonded together into a unitary mass with a phosphatic acid base binder.

A further object of this invention is to provide a composition of matter formed of molded bodies of wood particles bonded together into a unitary mass with a phosphatic acid base binder.

Still another object of this invention is to provide a composition of matter formed of extruded bodies of wood particles bonded together with a phosphatic acid base binder.

A still further object of this invention is to provide methods of forming molded extruded and other bodies of wood particles bonded with a phosphatic acid base binder.

With these and other objects in view which may appear more fully hereinafter, the invention comprises broadly the concept of utilizing binders of the phosphatic acid base type as disclosed in my co-pending application, Serial No. 422,460, filed December 10, 1941, now Patent No. 2,455,758 to form compositions of matter from finely divided wood particles such as pulp or sawdust.

As set forth in my above mentioned co-pending application, binders may be formed containing phosphates of trivalent metals, such as aluminum, iron and nickel, which under suitable conditions of water content, composition and mode of production form viscous, tacky, adhesive solutions which may be transformed into solids either by chemical reaction or by drying. Binders of this type are found to be particularly suitable in bonding together particles of wood, such as sawdust or wood pulp.

In forming compositions including wood as fillers, it is important in some instances that a binder be used which will have little, if any, effect on the appearance of the wood particles.

For instance, in utilizing certain phosphatic acid base binders of the type described in my above mentioned application, and particularly in instances in which molding is carried out at elevated temperatures and for long periods of time, the wood particles may become charred. Slight charring is of no consequence in many molded compositions particularly if dyes or pigments are incorporated therein. On the other hand, if the natural color of the wood particles is to be preserved, charring is a disadvantage and, to avoid this disadvantage, binders having less acid properties and molding procedures involving lower temperatures must be employed.

A binder particularly suitable for bonding of wood particles together to form compositions may be prepared by heating molecular proportions of aluminum sulphate and dicalcium phosphate together. In this instance, the aluminum sulphate may contain 14.5 mols of water for each mol thereof. In other words, 603 grams of aluminum sulphate are heated with 272 grams of dicalcium phosphate. Before mixing these ingredients there was added to each about 150 to 250 ccs. of water. The solution of aluminum sulphate and slurry of dicalcium phosphate were heated separately and, when boiling, they were mixed together with violent agitation to prevent the formation of lumps. A smooth, tacky liquid is formed and this may be mixed with a filler, such as wood flour.

Mixing of the binder with a wood flour may be effected in a mechanical mixer to assure a uniform product.

After thorough mixing, the mass may be dried, for instance by exposure to air, at room temperature or below 50° C. The resultant solidified mass should then be ground so that it will pass through a 65 mesh screen to produce a molding powder. In preparing the mix approximately 55% binder and 45% wood flour, calculated on a water-free basis, should be employed. If the quantity of binder is reduced to half of the above mentioned value, a powder can still be obtained capable of being molded, but the plasticity and flow of the same in the mold is somewhat reduced. The powdered mixture of wood flour and binder described above is very suitable for use as a molding powder and good molding results may be obtained at mold temperatures of 100 to 150°

C. and under pressures of between 1500 to 10,000 pounds per square inch. The preferred temperature range lies between 100 and 125° C. and the preferred pressures vary between 2000 and 4000 pounds per square inch. The temperature molding time and pressure employed will vary with the size and thickness of the articles to be molded.

In addition to the compositions set forth above suitable for carrying out the present invention, compositions found desirable are as follows:

*Formula I*

| | Parts |
|---|---|
| Al. sulphate | 603 |
| Mono calcium phosphate | 252 |
| Asbestos, or serpentine dust, or calamine (zinc trisilicate) power | 75 |
| Sawdust | 1710 |

*Formula II*

| | Parts |
|---|---|
| Aluminum sulphate | 603 |
| Dicalcium phosphate | 272 |
| Sawdust | 1750 |

*Formula III*

| | Parts |
|---|---|
| Aluminum sulphate | 603 |
| Dicalcium phosphate | 273 |
| Asbestos, or serpentine dust, or calamine (zinc trisilicate) powder | 75 |
| Sawdust | 1750 |

It has been determined that certain metallic salts of inorganic acids exist as hydrates in which the degree of hydration is sufficient to dissolve and liquefy the salt under certain conditions of temperature and pressure. The metallic salts thus dissolved in their own water of crystallization will react with the phosphatic material to form the binders herein disclosed. The temperatures and pressures at which the hydrated metallic salts dissolve vary with the degree of hydration. For example, aluminum sulphate containing 18 mols of water will melt in its own water of crystallization at 85° C. and in this form will react with either mono- or dicalcium phosphate to produce an excellent binder.

A composition according to the present invention may be made with such binders. For instance, by mixing in the dry finely divided state aluminum sulphate (containing water of crystallization) and mono- or dicalcium phosphate, in proportions sufficient to form an effective binder upon heating and wood flour or sawdust and subjecting the mix to temperatures of between 100 to 125° C. and under pressures of between 1500 and 10,000 pounds per square inch in a mold a product is obtained corresponding to the product hereinbefore described. The proportion of the binder and filler and the proportions of the ingredients of the binder may be substantially those of the process herein described in which water is added.

The following mixture was ball milled in a dry state until a homogeneous mass was obtained: wood particles, aluminum sulphate, and dicalcium phosphate. The finely divided dry mixture of sulphate and phosphate was prepared in molar ratio or 603 grams of sulphate containing 14.5 mols of water and 272 grams of phosphate. The homogeneous mixture is thereupon heated and subjected to pressure to liquefy the hydrated salt and carry out the reaction whereby a water insoluble binder is formed.

Another binder composition which has been found to be very satisfactory was prepared by mixing equimolecular quantities of aluminum sulphate and the mono calcium phosphate as follows:

| | Parts by weight |
|---|---|
| $Al_2(SO_4)_3 \cdot 18H_2O$ | 666 |
| $Ca(H_2PO_4)_2 \cdot H_2O$ | 252 |

The above binding agent was incorporated with wood particles in the following proportions and molded with heat and pressure to provide a well bonded and perfectly dense material.

| | Parts by weight |
|---|---|
| Wood particles | 15 |
| Binder | 15 |

The proportions of the above components, however, may vary considerably but they remain roughly within the range of from 30-80% wood particles, 20%-50% sulphate-phosphate mixture and 10-30% insolubilizing basic material.

To this mixture may be added barium carbonate, lead oxide or other modifying ingredients such as copper ferrite, magnesium oxide, fly ash (from dust fired furnaces), ferric oxide, zinc oxide, Portland cement, talc clay and aluminum oxide.

This process is particularly desirable in the bonding of fibrous material such as dry wood pulp or asbestos. In the latter instance nodulizing is not produced and better mixing is obtained. Furthermore, a reaction between the phosphate binder and asbestos usually takes place, prematurely in the case of a wet binder, but when asbestos fiber is mixed with the dry ingredients of the binder, a reaction with the asbestos does not take place until after or during molding and then tends to improve the water resistance and insoluble properties of the product.

It has been found that the water-proof qualities of the plastic articles made in accordance with the present invention may be improved by incorporating a solid that will not react at room temperature but will react readily during the molding operation or afterwards to form an insoluble compound. Such a solid may be, for instance, a silicate such as asbestos or serpentine tri-magnesium phosphate and other magnesium, zinc, lime or aluminum compounds of a basic nature.

In place of the wood flour, other granular, powdered or fibrous substances may be used as a filler. Such substances as sawdust, asbestos, ceramic grog, etc., may be used. Paper and wood fiber felt in sheet form may be impregnated with binder and dried and the dried product laminated and pressed under heat to form a laminated article.

A molding powder prepared from wood flour and binder is oil-repellent and therefore a small quantity of oil, wax, soaps, such as sodium, aluminum, calcium, magnesium stearate, or resinate, and similar materials may be incorporated in the molding powder in quantities of from a trace to 10%. These substances act as lubricants and may be pressed out during the molding operation and coat the surface of the mold and aid in the flow of the powder.

Instead of oil, or in addition thereto, a thermosetting or thermoplastic resin may also be incorporated. For this purpose materials such as Vinylite, phenolic resin, urea, formaldehyde resin, etc., may be used. Such a resin will improve the finish, strength and waterproof characteristics of the resulting composition. Tests have been made which indicate that about 5 to 15% of the resin may be sufficient to accomplish the above result. In producing plastics formed of wood bonded with a binder as hereinbefore described and including an organic resin, products can be obtained which will result in a saving of a minimum of about one-half of the organic resins now incorporated in molding powders. For this purpose the phosphate plastic would act as an extender or as a filler for compositions employing organic plastics and would greatly reduce the price of the final product.

In place of wood flour as a filler for the phosphate plastic, nut flour, sawdust, asbestos floats, wood pulp (short fiber) diatomaceous earth and water ground mica may be used.

The color of the resulting compound will be determined by the incorporation of pigments or dyes in the molding powder. In this connection, carbon black in a quantity of about 2% may be utilized to produce a black molding powder.

If desired to lessen the speed of reaction of the binder with an insolubilizer such as serpentine or magnesium oxide, a small quantity of magnesium sulphate may be added.

From the foregoing description it will be appreciated that the present invention provides a plastic composition which is of extensive utility and several methods of preparing the same.

I claim:

1. A woody composition of matter comprising particles of wood constituting 30%–80% of the composition bonded together with a binder formed of aluminum sulphate and dicalcium phosphate constituting 20–50% of the composition.

2. A woody composition of matter comprising particles of wood constituting 30–80% of the composition bonded together with a thermo-setting binder formed of aluminum sulphate, di-calcium phosphate composing 20–50% of the composition and an insolubilizer of serpentine dust.

3. A method of producing a molding powder comprising incorporating wood particles constituting 30–80% of the composition in a tacky solution of aluminum sulphate and a calcium phosphate selected from the group consisting of di-calcium phosphate and mono-calcium phosphate, drying the resulting composition, and pulverizing the dried composition.

4. A method of forming shaped articles comprising incorporating wood particles constituting 30–80% of the composition in a tacky solution of aluminum sulphate and a calcium phosphate selected from the group consisting of di-calcium phosphate and mono-calcium phosphate, drying the resulting composition, pulverizing the dried composition, and molding the powder under heat and pressure.

5. A method of forming shaped articles comprising incorporating wood particles in a tacky solution of aluminum sulphate and a calcium phosphate selected from the group consisting of di-calcium phosphate and mono-calcium phosphate, drying the resulting composition at a temperature below 50° C., pulverizing the dried composition, and molding the powder at temperatures of 100–125° C. under pressure.

6. A method of forming shaped articles comprising incorporating wood particles in a tacky solution of aluminum sulphate and a calcium phosphate selected from the group consisting of di-calcium phosphate and mono-calcium phosphate, drying the resulting composition at a temperature below 50° C., pulverizing the dried composition, and molding the powder at temperatures of 100–125° C. and under pressures of 1,500 to 10,000 pounds per square inch.

7. A method of forming shaped compositions comprising forming a mixture of aluminum sulphate containing water of crystallization, a calcium phosphate selected from the group consisting of di-calcium phosphate and mono-calcium phosphate and fibrous material all in finely divided form and subjecting the mixture to heat and pressure sufficient to effect melting of the aluminum sulphate in its water of crystallization and interaction between the so melted aluminum sulphate and calcium phosphate to form a bond for the fibrous material.

8. A woody compostion of matter comprising particles of wood bonded together with a binder formed of aluminum sulphate and dicalcium phosphate, the proportions of the wood, aluminum sulphate and dicalcium phosphate being in the approximate ratio of 1750 to 603 to 272.

9. A woody composition of matter comprising particles of wood bonded together with a binder formed of aluminum sulphate, dicalcium phosphate and an insolubilizer in the approximate ratio of 1750 to 603 to 272 to 75.

10. A plastic composition suitable for use as a molding powder comprising aluminum sulphate containing its water of crystallization, di-calcium phosphate, and fibrous material in the approximate ratio of 603 to 272 to 1750, all in finely divided form and thoroughly mixed.

HERBERT H. GREGER.

REFERENCES CITED

The following references are of record in the file of this patent:

UNITED STATES PATENTS

| Number | Name | Date |
| --- | --- | --- |
| 225,817 | Fletcher | Mar. 23, 1880 |
| 2,293,914 | Nanfeldt | Aug. 25, 1942 |
| 2,330,233 | Morris | Sept. 28, 1943 |

FOREIGN PATENTS

| Number | Country | Date |
| --- | --- | --- |
| 233,907 | Great Britain | 1925 |
| 326,825 | Great Britain | 1929 |